A. PFAU.
RELIEF MECHANISM.
APPLICATION FILED FEB. 17, 1913.
1,136,609.
Patented Apr. 20, 1915.
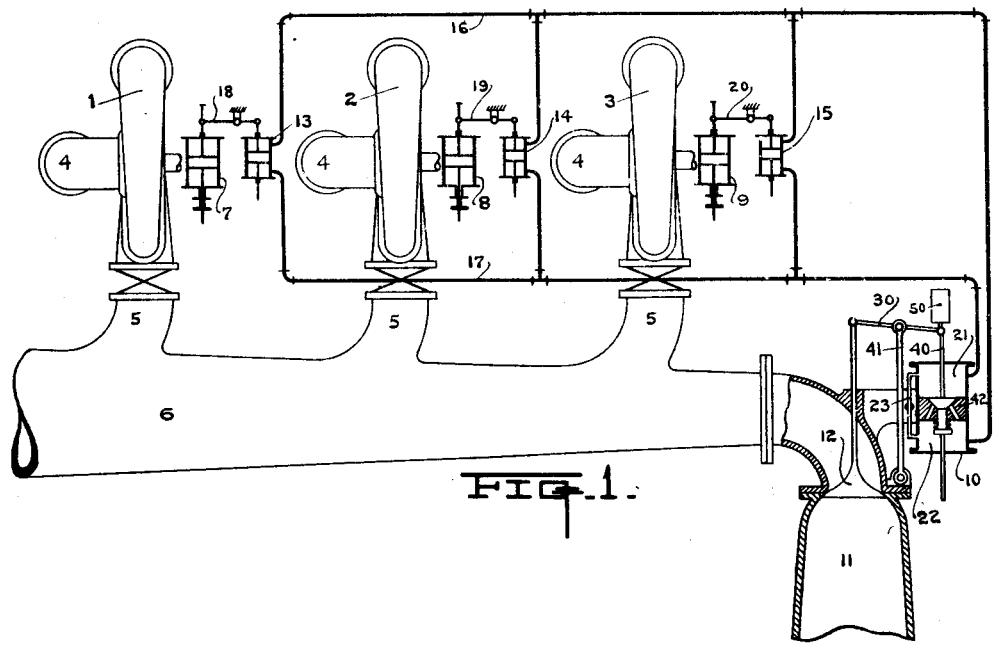
FIG. 1.
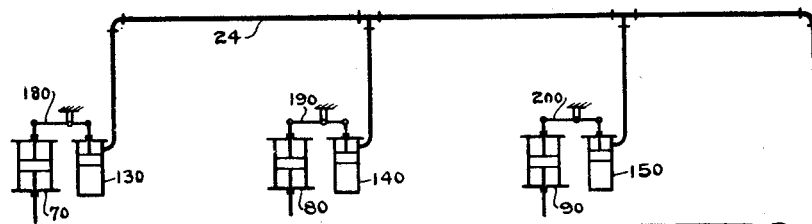
FIG. 2.
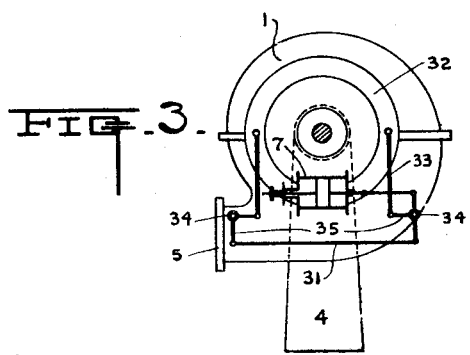
FIG. 3.
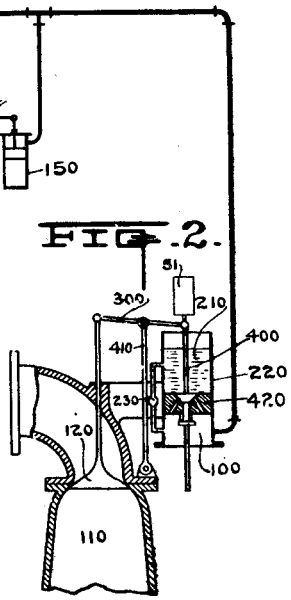
WITNESSES
W H Lieber
Ella Brickell
INVENTOR
A. Pfau
BY
ATTORNEY.

UNITED STATES PATENT OFFICE.

ARNOLD PFAU, OF MILWAUKEE, WISCONSIN, ASSIGNOR, BY MESNE ASSIGNMENTS, TO ALLIS-CHALMERS MANUFACTURING COMPANY, A CORPORATION OF DELAWARE.

RELIEF MECHANISM.

1,136,609.         Specification of Letters Patent.     Patented Apr. 20, 1915.

Application filed February 17, 1913. Serial No. 749,537.

*To all whom it may concern:*

Be it known that I, ARNOLD PFAU, a citizen of the Republic of Switzerland, residing at Milwaukee, in the county of Milwaukee and State of Wisconsin, have invented certain new and useful Improvements in Relief Mechanism, of which the following is a specification.

This invention relates to improvements in the construction of relief mechanism for preventing injury to pipe lines or conduits which supply fluid under pressure to a plurality of prime movers or other fluid utilizing means in which the demand for fluid is subject to sudden variations.

An object of the invention is to provide a relief machanism which will automatically and efficiently relieve a pipe line supplying fluid under pressure to a plurality of fluid utilizing means, from undesirable excessive pressures induced by sudden unbalanced variations in the demand for fluid by the utilizing means.

The invention as herein disclosed is applied to a hydraulic turbine installation in which a plurality of Francis turbines receive high pressure fluid supply from a common penstock, which penstock is provided with a single relief mechanism of the type generally known as a water saving synchronous relief valve. The single relief valve mechanism is disclosed as being operable by fluid means actuated directly from the gate mechanisms of the turbines. It is not however intended to limit the invention to this specific disclosure which has been selected for purposes of description as being one of the simplest embodiments of the device.

The invention is capable of application to any means for supplying fluid under pressure and may embody various alternative types of fluid utilizing means, such as nozzles for impulse turbines, hydraulic giants, etc. The relief mechanism disclosed in the present application is also intended to show merely one of the various alternative forms of this device which may be substituted, one of these being the old and well known synchronous by-pass water wasting relief mechanism. It is obvious also that the fluid means actuated directly from the gate mechanism and actuating the relief mechanism may readily be replaced by mechanical or electrically operated means without involving additional invention.

A clear conception of several embodiments of the invention may be had by referring to the drawing accompanying and forming part of this specification in which like reference characters designate the same or similar parts in the various views.

Figure 1 is a plan view, partly in section, of a three-unit hydraulic turbine installation showing the common penstock pressure relief mechanism thrown out of its normal plane and embodying double acting fluid means for actuating the pressure relief mechanism. Fig. 2 is a plan view, partly in section, of a penstock pressure relief mechanism embodying a single acting fluid means for actuating the pressure relief mechanism. Fig. 3 is an end view of one of the hydraulic turbine units showing the gate actuating mechanism thereof.

The penstock 6 which normally contains fluid, usually water, under pressure, is provided with a series of offtakes 5 and has a common discharge draft tube 11 at one end thereof. The fluid pressure utilizing means, which in the present disclosure are shown as prime movers or Francis turbines 1, 2, 3, have gate controlled inlets which connect with the offtakes 5 of the penstock 6. The turbines 1, 2, 3, are provided with draft tubes 4 which connect with the tail-race in the usual manner, see Figs. 1 and 3.

The gate mechanism of each of the turbines 1, 2, 3, consists of the usual circular series of vanes the positions of which are controllable by the movement of a ring 32, see Fig. 3. The ring 32 is connected with bell cranks 35 by means of links 33. The bell cranks 35 are adapted to swing upon stationary pivots 34 and are connected to each other by means of a link 31. The gate actuating motors 7, 8, 9, are provided with pistons having rods to the end of each of which one of the bell cranks 35 is connected. It will be noted that as one of the gate actuating motor pistons is moved in either direction, the corresponding turbine gates are simultaneously moved a proportional amount to either open or close same. The gate actuating mechanisms of all of the turbine units will be assumed to be analogous in both their construction and operation.

The relief mechanism disclosed in Fig. 1, consists essentially of a common relief valve 12, which controls the amount of fluid discharged from the penstock 6 direct to the tail-race through the draft tube 11. The upper end of the rod of the valve 12 is connected with one end of the lever 30, the opposite end of which lever connects with the upper portion of the piston rod 40. The mid portion of the lever 30 is pivoted to the upper end of the link 41, the lower end of which link is pivoted to the stationary casing of the relief valve. The rod 40 carries a valve returning weight 50 at its extreme upper end and is provided with a piston 42 at its mid portion. The piston 42 is reciprocable within the cylinder 10 and divides the cylinder 10 into upper and lower piston chambers 21, 22, respectively. The piston chambers 21, 22, are connected by a small controllable by-pass 23, the size of which may be readily varied by means of a valve adjustment. The piston 42 is provided with a number of through ports which are normally closed by means of a valve formed directly on the rod 40 and held in closed position by means of a spring or other suitable device.

Regulating cylinders 13, 14, 15 which are divided into chambers by means of pistons, the rods of which are connected with the piston rods of the gate actuating motors 7, 8, 9, respectively, by means of levers 18, 19, 20, respectively, have their upper piston chambers connected with the lower piston chamber 22 of the cylinder 10 by means of piping 16. The lower piston chambers of the regulating cylinders 13, 14, 15, are connected with the upper piston chamber 21 of the relief valve chamber 10 by means of piping 17. The cylinders 10, 13, 14, 15, and the pipes 16, 17, are preferably filled with a suitable operating fluid such as oil, the leakage of the system being supplied by any suitable means.

In the disclosure of Fig. 2, the common relief valve 120 of the penstock 6 controls the amount of fluid discharged from the penstock 6 direct to the tail-race through the draft tube 110. The upper end of the rod of the valve 120 is connected with one end of the lever 300, the opposite end of this lever being connected to the upper end portion of the rod 400 of the piston 420. The mid portion of the lever 300 is pivoted to the upper end of the link 410, the lower end of which is pivoted to the stationary casing of the relief valve. The valve returning weight 51 is secured to the extreme upper end of the rod 400. The piston 420 is reciprocable within the cylinder 220 and divides the cylinder into an inclosed lower chamber 100 and an open upper chamber 210. The small by-pass 230 connects the chambers 100, 210, being controllable in size by means of a valve. The piston 420 is provided with a number of through ports which are normally closed by means of a valve carried directly by the rod 400. Closing position of this valve is normally maintained by means of a spring or similar device.

The regulating cylinders 130, 140, 150, are provided with pistons the rods of which connect with the rods of the gate actuating motors 70, 80, 90, through levers 180, 190, 200. The upper displacement chambers of the regulating cylinders 130, 140, 150 are connected with the piston chamber 100 by means of piping 24.

During the operation of the installation, the individual turbines 1, 2, 3, may either furnish independent variable or constant loads, or they may all be connected to the same line so that each individual turbine furnishes a fixed proportion of the total load. In either case, if the total or arithmetic sum of all of the gate openings of the turbines 1, 2, 3, is suddenly diminished to compensate for a sudden reduction in the total load on the combined units, the relief valve opening must be correspondingly temporarily opened in order to prevent shock in the penstock 6 and the pipe line connected therewith. This temporary opening of the relief valve is effected simultaneously with the sudden reduction in the demand for motive fluid by the combined units, by means of the present invention and in the following manner: Supposing the turbines 1, 2, 3, to be operating at a predetermined normal load, say 5000 K. W. each, and that the load on turbine 1 is suddenly reduced to 4000 K. W. while the load on each of the other turbines 2 and 3 remains at 5000 K. W. the speed governor of turbine 1 will then act upon the servo or gate actuating motor 7 to close the turbine gate by an amount corresponding to the sudden load reduction of 1000 K. W. In closing the turbine gate, the piston of the actuating motor 7 will be moved in a direction toward the penstock 6, causing the piston of the regulating cylinder 13 to move in an opposite direction. Upon movement of the piston of the regulating cylinder 13 in a direction away from the penstock 6, a portion of the actuating fluid or oil from the upper piston chamber is forced through the pipe 16 and into the lower piston chamber 22 of the cylinder 10. Simultaneously with this displacement of oil, a corresponding amount of oil will be forced from the upper piston chamber 21 of the cylinder 10 through the pipe 17 into the lower piston chamber of the regulating cylinder 13. The admission of fluid to the chamber 22 below the piston 42 causes the piston to move upward quickly, carrying with it the rod 40 and weight 50. The upward motion of the rod 40 causes the relief valve 12 to open rapidly and thus permit free discharge of motive fluid from the penstock 6 through the draft tube 11 directly to the tail-race. This free discharge of motive fluid through the relief valve 12 momentarily maintains the amount of fluid discharged from the penstock 6 substantially constant. After the valve 12 has been thus suddenly opened and assuming that the turbine loads remain constant for a short period of time, the weight 50 becomes effective to gradually return the valve 12 to closed position by forcing the piston rod 40 and piston 42 downward. During the downward travel of the piston 42, oil is gradually forced from the chamber 22 into the chamber 21 through the by-pass 23. The rate of closing the valve 12 may be readily varied by changing the size of the passage through the by-pass 23. The sudden opening and gradual closing of the valve 12 permits gradual reduction of the amount of fluid discharged from the penstock 6 to compensate for sudden unbalanced variations in load on the fluid utilizing devices. The device when operating in this manner, furthermore provides means for preventing waste or by-passing of motive fluid during periods of constant load. This device would not however be adapted for use in installations where the turbines would be subjected to sudden increases in loads, since in such installations the water wasting synchronous by-pass arrangement of relief mechanism must be used in order to prevent injury to the supply pipe line, which may result from the surges occasioned by the sudden unbalanced increase in total load.

Upon an increase in load on turbine 1, say from 5000 to 6000 K. W., the piston of the servo-motor 7 moves in a direction away from the penstock 6 and causes the piston of the regulating cylinder 13 to move toward the penstock 6 and to force oil into the chamber 21 of the cylinder 10. With the valve 12 in closed position just prior to the increase in total load, the oil admitted to the chamber 21 will force the piston 42 downward against its retaining spring and will permit free passage of the oil from the chamber 21 to the chamber 22 directly through the body of the piston 42. If the valve 12 just prior to the increase in total load, is opened due to a prior sudden decrease in load, the valve 12 will first be closed by the oil entering the chamber 21, after which the oil will pass from the chamber 21 to the chamber 22 through the piston 42, in the manner above described. If, however, there is a sudden decrease in the load on one of the prime movers, and this variation in load is exactly balanced by a corresponding increase in the load on another of the prime movers, so that the arithmetic sum or total load on all of the prime movers before and after the change of load conditions remains the same, the relief valve 12 will not be disturbed. The changes in loads in such cases must however be simultaneous and the individual load variations must exactly counterbalance each other at all times. The reason for the non-disturbance of the valve 12 under such operating conditions, is that the arithmetic sum of the volumes of oil displaced from the upper and lower piston chambers of the individual regulating cylinders 13, 14, 15, respectively, remains constant throughout the load change and the volumes of oil in the chambers 21, 22, of the cylinder 10 are not altered.

During a sudden decrease in load on one of the turbines 1, 2, 3, with a single-acting device as disclosed in Fig. 2 applied, the loads on the other turbines remaining constant, oil is forced through the pipe 24 into the chamber 100 of the cylinder 220. The sudden admission of oil to the chamber 100 forces the piston 420 upwardly, raising the rod 400 and weight 51, opening the valve 120 quickly. After the valve 120 has been thus suddenly opened, the weight 51 becomes effective in gradually closing the valve 120 by forcing the piston 420 downwardly and by-passing fluid from the chamber 100 to the chamber 210 through the by-pass 230. With an unbalanced increase in load on the turbines 1, 2, 3, oil is withdrawn from the chamber 100 of the cylinder 220, thus tending to reduce the pressure within the chamber 100 and causing the head of oil above the piston 420 to force the piston 420 downward. The piston 420 upon being forced downwardly compresses its retaining spring and opens the piston through ports, thus permitting free passage of fluid from the chamber 210 to the chamber 100 directly through the piston 420. It should be noted that if the arithmetic sum of the loads on the turbines 1, 2, 3, in the device as disclosed in Fig. 2, does not change, the valve 120 will not be affected, no matter what the variations in load on the individual prime movers may be.

If the unbalanced variations in load on the prime movers is very gradual, the valve 12, 120, will not be affected since during such gradual change in the total load, the oil admitted to or withdrawn from the chambers 21, 22, 100, 210, may readily be compensated for by its simultaneous passage through the by-pass 23, 230, simultaneously with the load variation. Under such conditions of operation the penstock 6 and pipe line connected therewith will not be subjected to shock since the shock results only from the sudden choking off of the discharge openings leading from the penstock.

It should be understood that it is not desired to be limited to the exact details of construction shown and described, for obvious modifications will occur to a person skilled in the art.

It is claimed and desired to secure by Letters Patent,—

1. In combination, a plurality of prime movers, means common thereto for supplying motive fluid to said prime movers, load affected devices controlling the flow of fluid from said supply means to said prime movers, means connecting said devices for effecting the algebraic sum of the movements of said devices, and means operable by said connecting means to an extent proportional to said algebraic sum for permitting discharge of fluid from said common supply means.

2. In combination, a plurality of turbines, a penstock common thereto for supplying fluid to said turbines, gates affected by the load on said turbines for controlling the flow of fluid from said penstock to said turbines, means connecting said gates for effecting the algebraic sum of the movements of said gates, and a relief valve common to said turbines and operable by said connecting means to an extent proportional to said algebraic sum for permitting discharge of fluid from said penstock.

3. In combination, a plurality of prime movers, means common thereto for supplying motive fluid to said prime movers, load affected devices controlling the flow of fluid from said supply means to said prime movers, fluid pressure means connecting said devices for effecting the algebraic sum of the movements of said devices, and means operable by said fluid pressure means to an extent proportional to said algebraic sum of the movements of said devices for permitting discharge of fluid from said common supply means.

4. In combination, a plurality of turbines, a penstock common thereto for supplying water to said turbines, load affected gates controlling the flow of water from said penstock to said turbines, fluid pressure means connecting said gates for effecting the algebraic sum of the movements of said gates, and a relief valve common to said turbines and operable by said fluid pressure means to an extent proportional to said algebraic sum of the movements of said gates for permitting discharge of water from said penstock.

5. In combination, a plurality of prime movers, means common thereto for supplying motive fluid to said prime movers, load affected devices controlling the flow of fluid from said supply means to said prime movers, fluid pressure means connecting said devices independently of said supply means, and means operable by variations in pressure in said fluid pressure means for permitting discharge of fluid from said common supply means, said variations being induced by movement of said devices.

6. In combination, a plurality of turbines, a penstock common thereto for supplying water to said turbines, load affected gate mechanisms controlling the flow of water from said penstock to said turbines, fluid pressure means connecting said gate mechanisms independently of said penstock, and a relief valve common to said turbines and operable by variations in pressure in said fluid pressure means for permitting discharge of water from said penstock, said variations being induced by movement of said gate mechanisms.

In testimony whereof, the signature of the inventor is affixed hereto in the presence of two witnesses.

ARNOLD PFAU.

Witnesses:
J. F. M. PATITZ,
G. F. DE WEIN.